UNITED STATES PATENT OFFICE.

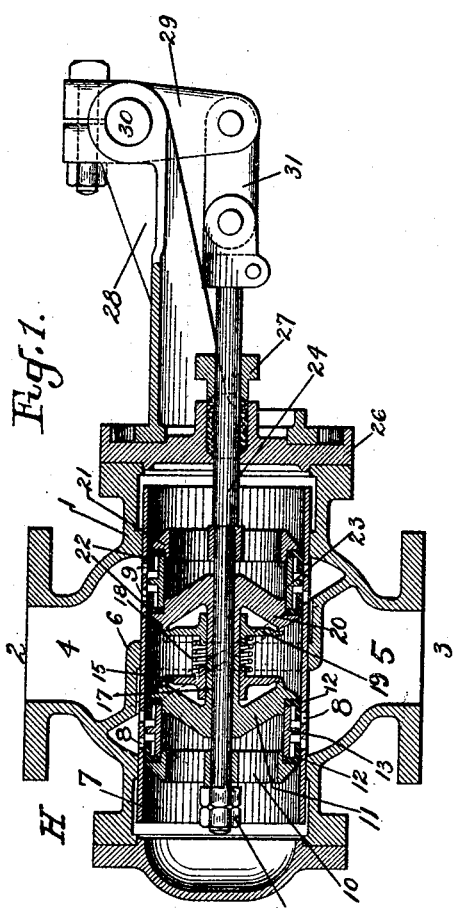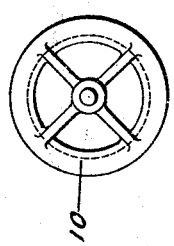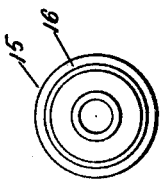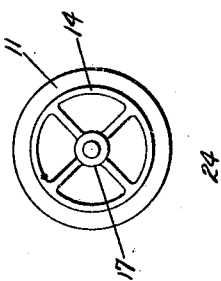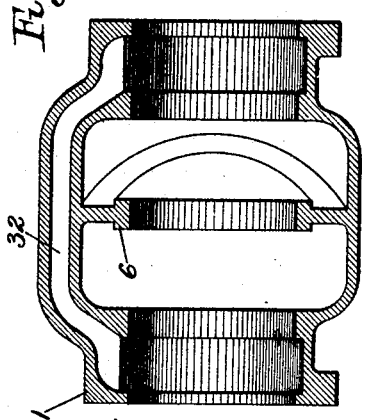

ISRAEL C. HALL, OF SAN FRANCISCO, CALIFORNIA, ASSIGNOR TO OTIS ELEVATOR COMPANY, OF JERSEY CITY, NEW JERSEY, A CORPORATION OF NEW JERSEY.

VALVE.

1,200,491.  Specification of Letters Patent.  Patented Oct. 10, 1916.

Application filed May 3, 1913. Serial No. 765,207.

*To all whom it may concern:*

Be it known that I, ISRAEL C. HALL, a citizen of the United States, residing in San Francisco, in the county of San Francisco and State of California, have invented a new and useful Improvement in Valves, of which the following is a specification.

My invention relates to improvements in valves for elevators, and has for an object the provision of a simple, practical and efficient valve mechanism particularly adapted for use in connection with a hydro-pneumatic or hydro-steam elevator system, although the same may have a general use.

Other objects of the invention will appear hereinafter, the novel combinations of elements being pointed out in the appended claims.

In the drawings accompanying this specification, Figure 1 is a sectional detail view of a valve containing an embodiment of my invention; Fig. 2 is a sectional plan view of the valve casing shown in Fig. 1; Figs. 3, 4 and 5 are detail views of certain of the valve parts.

Like reference characters denote similar parts throughout the figures.

Referring to Figs. 1, 2, 3, 4 and 5, the valve H therein shown comprises a cast iron casing 1, closed at both ends, which has two openings 2 and 3 for the passage of water or other fluid. Each opening leads into a chamber such as 4 and 5, respectively, which are separated from each other by a web 6. The interior of the valve casing is bored out to receive a close fitting sleeve or lining 7 having a double row of ports such as 8 and 9, communicating with the chambers 5 and 4, respectively. Each double row of ports such as 8 is controlled by a valve comprising a pair of flanged spiders 10 and 11 (see Figs. 3 and 4), between which are located a pair of oppositely arranged cup leathers 12—12 and a retaining ring 13. The spider 11 is provided with a valve seat 14 (Fig. 4) which co-acts with a flattened portion 16 of a check valve 15 (Fig. 5). The latter is slidably supported upon a hub or boss 17 formed integral with the spider 11 and is normally pressed upon its seat 14 by means of a compression spring 18. The other end of this spring bears against a check valve 19 arranged to seat upon a spider 20, which, together with a spider 21, supports a pair of oppositely disposed cup leathers 22 and a retining ring 23. The several spiders 10, 11, 20 and 21, are mounted upon a valve rod 24 and secured against movement thereon by means of nuts 25, the removal of which permits the entire valve mechanism to be removed for repairs or replacement of new parts. The valve rod 24 passes through a stuffing box and gland 27 in the head 26, and may be connected by a link 31 to a lever 29 which is pivoted at 30 to a bracket 28, carried by the head 26. As shown in Fig. 3, both ends of the valve casing are in communication through a passage 32 the purpose of which is to effect a balanced condition of the valve for all positions.

The valve apparatus may be termed a double check valve and it operates as follows: Assuming there is a fluid pressure in the chamber 4, the valve rod 24, together with the parts assembled thereon is moved in a left hand direction until the right hand cup leathers 22 uncover the double row of ports 9. The fluid can now flow in the direction desired provided the pressure in chamber 4 is greater than that in chamber 5, while, if the pressure in chamber 5 is greater than that of chamber 4, the fluid is prevented from flowing in the wrong direction by the check valve 19. When the pressure in chamber 4 is greater than that of chamber 5, the fluid will pass through the ports 9, pass into the right hand end of the valve casing through the spiders 21 and 20, and forcing the check valve 19 open, pass through the double row of ports 8, which are now uncovered by the cup leathers 12, and into the chamber 5, and through the valve opening or port 3. The check valve 19 will permit the fluid to flow as long as the pressure in the chamber 4 is able to overcome the tension of the spring 18, which tension is merely sufficient to insure the proper seating of the valve when the pressure is substantially the same on both sides of it, but the valve 19, after the manner of check valves in general, will not permit a reverse flow of fluid, *i. e.*, from the chamber 5 to the chamber 4. If the valve rod and connected parts be moved to the extreme right fluid may flow from the chamber 5 to the chamber 4, by way of the ports 8, check valve 15, and ports 9. When the valve is centered as shown, there can be no flow of fluid through the valve in any direction by reason of the position of the cup leathers with respect to the ports controlled thereby.

The function and arrangement of the valve in an elevator plant is fully described in C. I. Hall Patent, No. 443,644, December 30, 1890, elevator valve mechanism.

It will be observed that the valve herein disclosed absolutely prevents the flow of fluid in the wrong direction which is a matter of vital importance in connection with an elevator. In order more fully to understand the necessity of preventing the flow of fluid in a direction different from that intended, we will assume that it is desired to raise the elevator and the valve is moved in a left hand direction. Should the tank be partially empty of fluid or devoid of pressure when the valve is open, the elevator would tend to descend instead of going up as intended, unless prevented by the check valve 19, until such time as the pressure accumulated in the tank to support or raise the elevator. The same action would occur with the valve moved to the right to lower the elevator if the pressure in the tank was greater than that in chamber 5, were it not prevented by the check valve 15. A similar action occurs in the reverse direction when the valve is moved to the right, that is the fluid will flow from chamber 5 to chamber 4, (Fig. 1).

My improved valve H which controls the flow of water to and from the plunger cylinder, contains several advantageous features over other valves that have been used for a similar purpose. In the first place, this valve is simple and rugged in its construction, contains but few parts, may be built at small expense, and will remain fluid tight for an indefinite period. All of the parts are readily accessible and the entire valve mechanism may be removed for inspection or replacement by taking off the valve cover, and removing the nuts 25 (Fig. 1). The check valves 15 and 19, as well as the spiders 10, 21, and 11, 20, respectively, and other parts, are interchangeable and the check valves require but a single spring properly to hold both of them on their seats. The entire valve mechanism is substantially balanced under all conditions of pressure and regardless of the different positions of the valve, which renders the valve very easy to move, a feature of signal importance in elevator work particularly where manual power is used to operate the customary hand rope, lever or other operating device to effect the movements of the controlling valve.

While I have shown and described a valve constructed and arranged according to my invention, I desire not to be limited to the arrangement herein shown, since it is obvious that one skilled in the art could readily modify the same in various particulars without departing from the spirit and scope of the invention.

What I claim is:—

1. The combination with a valve, of valve chambers, ports connecting with said chambers, cylinder valves for opening and closing said ports, and means for permitting fluid to flow from one chamber to the other in a direction depending upon the position of the said valves.

2. The combination with a valve, of valve chambers, ports connecting with said chambers, cylinder valves for opening and closing said ports, and check valves for permitting fluid to flow from one chamber to the other in a direction depending upon the position of the said valves.

3. The combination with a valve, of valve chambers, ports connecting with said chambers, cylinder valves for opening and closing said ports, and check valves carried by the cylinder valves arranged to permit fluid to flow from one chamber to the other in a direction depending upon the position of the said cylinder valves.

4. The combination with a valve, of valve chambers, ports in said chambers, valves for opening and closing said ports, check valves for permitting fluid to flow from one chamber to the other in a direction depending upon the position of the said valves, and means for balancing said check valves.

5. The combination with a valve, of chambers therein, ports in said chambers, valves for opening and closing said ports, check valves carried by said controlling valves, and means for balancing said check valves.

6. The combination with a valve, of chambers therein, ports in said chambers, valves controlling said ports, check valves carried by said controlling valves and opening in opposite directions to each other, and a single spring adapted normally to maintain said check valves in closed position.

7. The combination with a valve, of chambers therein, ports leading into said chambers, sleeve valves for opening and closing said ports, a passage through said sleeve valves, and check valves arranged normally to close the said passages.

8. The combination with a valve, of chambers therein, ports leading into said chambers, sleeve valves for opening and closing said ports, a passage through said sleeve valves, and check valves carried upon each sleeve valve and arranged normally to close the said passages.

9. The combination with a valve, of chambers therein, ports leading into said chambers, sleeve valves controlling said ports, a passage through said sleeve valves, check valves carried upon and movable with respect to each sleeve valve and arranged normally to close the said passages, and a single means for maintaing the check valves in closed position.

10. The combination with a valve, of chambers therein, ports leading into said chambers, reciprocating sleeve valves for opening and closing said ports, a passage through the said valves, check valves arranged normally to close said passages and carried upon and movable with said sleeve valves, and means for substantially balancing said check valves for every position of the said sleeve valves.

11. The combination with a valve, of a casing closed at both ends, a partition dividing the casing into two parts or chambers, a double sleeve valve for opening and closing ports leading into each chamber, a check valve associated with each sleeve valve, and a passage leading from one end of the casing to the opposite end for the purpose of substantially balancing the check valves for every position of the said sleeve valves.

12. The combination with a valve, of a casing closed at both ends, a partition dividing the casing into two parts or chambers, a double sleeve valve for opening and closing ports leading into each chamber, a check valve associated with each sleeve valve, and a reciprocating valve rod extending outside of the valve casing and having assembled upon it all of the said valves.

13. The combination with a valve, of chambers therein, ports leading into said chambers, valves for normally closing said ports, a passage through said valves, and check valves for normally closing said passages.

14. The combination with a valve, of two valve chambers therein, a separate set of ports leading into each chamber, a separate valve for each set of ports normally in position to close the ports, a passage through each valve, and check valves for controlling the direction of fluid flow through said passages.

15. The combination with a valve, of two valve chambers therein, a separate set of ports leading into each chamber, a separate valve for each set of ports normally in position to close the ports, a passage through each valve, check valves controlling said passages, and a single spring controlling both of said check valves.

16. In a fluid pressure elevator comprising a motor cylinder and a source of fluid pressure supply, the combination of a valve having a plurality of chambers, one chamber connected with the supply and another chamber connected with the motor cylinder, valve ports for placing said chambers into communication with each other, valves normally closing said ports, and check valves for controlling the direction of fluid flow through the ports.

In testimony whereof, I have signed my name to this specification in the presence of two subscribing witnesses.

ISRAEL C. HALL.

Witnesses:
RALPH HAIGHT,
D. B. RICHARDS.

Copies of this patent may be obtained for five cents each, by addressing the "Commissioner of Patents, Washington, D. C."